S. W. FORD.
CRANK HANGER FOR BICYCLES AND THE LIKE.
APPLICATION FILED AUG. 8, 1913.

1,088,140.

Patented Feb. 24, 1914.

Witnesses
O. M. Wernich
Ruth Ringle

Inventor
Shelley W. Ford
by Gillson & Gillson
attys

UNITED STATES PATENT OFFICE.

SHELLEY W. FORD, OF CHICAGO, ILLINOIS.

CRANK-HANGER FOR BICYCLES AND THE LIKE.

1,088,140.

Specification of Letters Patent.

Patented Feb. 24, 1914.

Application filed August 8, 1913. Serial No. 783,726.

*To all whom it may concern:*

Be it known that I, SHELLEY W. FORD, a citizen of the United States, and resident of Chicago, county of Cook, and State of Illinois, have invented certain new and useful Improvements in Crank-Hangers for Bicycles and the like, of which the following is a specification, and which are illustrated in the accompanying drawings, forming a part thereof.

The invention relates to frames for bicycles, motorcycles, and the like and contemplates improvements in the construction of the crank hanger and in the manner of uniting the same with the adjacent parts of the frame.

Among the objects of the invention are to secure greater strength and rigidity in the frame; to provide an improved support for the crank shaft and to effect a more uniform distribution of the strains upon the several parts.

Figure 1:
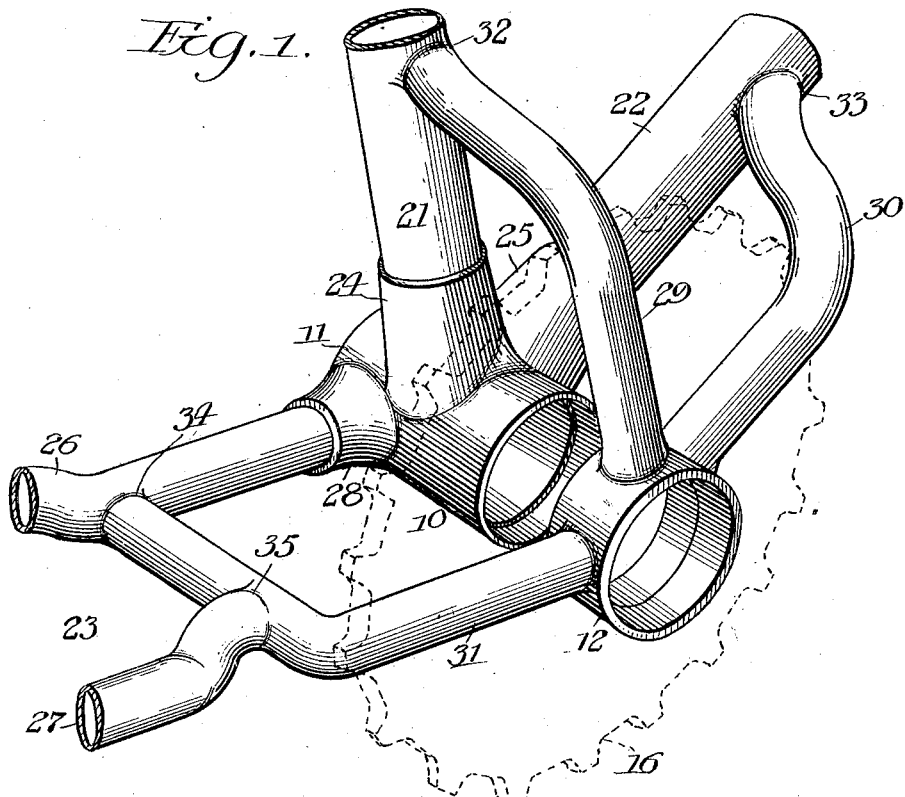
Figure 2:
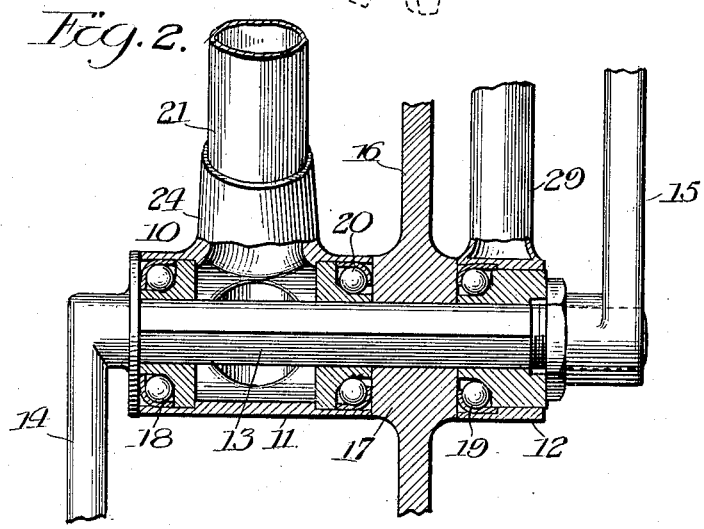

In the accompanying drawing, Figure 1 is a detail perspective view of a bicycle frame embodying the features of improvement provided by the invention, and Fig. 2 is a sectional view taken centrally through the crank hanger and showing details of the crank shaft and the relative position of the bearings which may be provided therefor.

In carrying out the invention a crank hanger 10 of the usual tubular form but comprising two non-connecting sections, as 11, and 12, is preferably employed. The crank shaft is shown at 13, in Fig. 2. This crank shaft will desirably extend through both sections of the hanger 10, and is provided with the usual cranks as 14, 15, upon its opposite ends. The driving sprocket 16 is mounted upon the crank shaft 13, between the two sections 11 and 12 of the hanger, its hub, 17, preferably substantially filling the space between such parts. This arrangement permits of the use of ball bearings conventionally shown at 18 and 19 upon opposite sides of the sprocket wheel 16. These ball bearings will preferably be located adjacent the opposite ends of the crank shaft 13. As shown, the ball bearings 18, are mounted in the usual position at one end of the hanger 10. The ball bearings 19 are located upon the opposite side of the driving sprocket 16, from the ball bearings 18, by being mounted in the section 12 of the hanger. If desired, a third set of ball bearings, as 20, may be provided. These are desirably symmetrically positioned with the ball bearings 19, in respect to the driving sprocket 16 and are accordingly located at the inner end of the section 11 of the hanger.

The usual upright and forwardly inclined frame members are shown at 21 and 22. The rear fork is shown at 23. The frame members 21 and 22 are located in the median plane of the frame and are united with the section 11 of the hanger 10, as by the use of tubular nipples 24 and 25 formed upon the latter. The rear fork 23 comprises two arms as 26 and 27 located upon opposite sides of the median plane of the frame. Preferably, only one of the arms, as 26 of the rear fork 23, will be directly connected with the section 11 of the hanger. As shown, the arm 26 is inwardly offset adjacent its forward end in the usual manner and is united with the section 11 of the hanger by means of a tubular nipple 28 formed upon the latter.

A plurality of supplemental frame members or stays, as 29, 30 and 31 are provided for supporting the outer section 12 of the hanger. Each of these supplemental frame members or stays are shown as being of angular form and one is located in a plane with each of the three main frame members, as the upright member 21, the forwardly inclined member 22 and the rear fork 23. Each supplemental frame member is united with the outer section 12 of the hanger at one of its ends and extends outwardly therefrom beyond the rim of the driving sprocket 16. These supplemental frame members then extend inwardly about the driving sprocket, the member 29 being united with the upright 21, as at 32, the member 30 being united with the forwardly inclined part 22, as at 33, and the part 31 being united with the arms 26 and 27 of the rear fork 23, as at 34 and 35. When only one of the arms, as 26, of the rear fork 23 is directly connected with the section 11, of the hanger, as shown, the other arm, as 27, of the rear fork 23, terminates at its point of connection with the supplemental frame member or stay 31.

The construction insures additional strength in the frame at the point of connection of the parts 21, 22 and 23 with the hanger 10 and provides a symmetrical support for the driving sprocket 16. When the intermediate ball bearings, as 20, are employed, the thrust of the driving sprocket 16, is equally divided between bearings located upon opposite sides of the sprocket and all tendency to flex the crank shaft 13, is avoided. A symmetrical arrangement of the parts 18, 19 with reference to the two cranks 14, 15, is nevertheless preserved. In addition to providing added strength in the frame, the supplemental frame members 29 and 30 serve to guard the driving sprocket 16, against contact with the clothing of the rider.

I claim as my invention,—

1. A bicycle frame comprising a pair of tubular members located in axial alinement and forming a two-part hanger, the said two parts of the hanger being longitudinally spaced apart to receive a driving sprocket between them and one of said parts intersecting the median plane of the frame.

2. A bicycle frame comprising, in combination, a pair of tubular members located in axial alinement and forming a two-part hanger, the said two parts of the hanger being longitudinally spaced apart to receive a driving sprocket between them, upright and forwardly inclined members and a rear fork, all symmetrically disposed with respect to the median plane of the frame and each directly united with one of said parts of the hanger, and a plurality of lateral stays each connecting the other part of the hanger with one of said symmetrically disposed members, each of the said stays being so formed as to provide for the turning of the sprocket between the parts which it connects.

3. In a bicycle, in combination, a frame comprising upright, forwardly inclined and rear fork members and a horizontal tubular member, the last-named member intersecting the median plane of the frame and being directly united with each of the first three named parts, a driving sprocket located at one side of said horizontal tubular member, a crank shaft carrying the said driving sprocket, said crank shaft extending laterally in both directions from the sprocket and one of its parts being journaled in the said horizontal tubular member, and a journal bearing for that part of the crank shaft which is beyond the sprocket from the said horizontal tubular member, said journal bearing being rigidly connected to the frame.

4. In combination, a bicycle frame comprising a pair of tubular members located in axial alinement and forming a two part hanger, the parts of the hanger being longitudinally spaced apart and one of them intersecting the median plane of the frame, a driving sprocket turning between the said parts of the hanger, a crank shaft extending through both of the said parts of the hanger and carrying the said sprocket and ball bearings for the crank shaft located in three different planes, two of said planes being located intermediate the ends of that part of the hanger which intersects the median plane of the frame and on opposite sides of said plane and the third one of said planes being located intermediate the ends of the other part of the hanger.

SHELLEY W. FORD.

Witnesses:
JOHN T. HUGHES,
F. D. HORNER.

Copies of this patent may be obtained for five cents each, by addressing the "Commissioner of Patents, Washington, D. C."